United States Patent [19]

Lazet

[11] Patent Number: 4,474,594
[45] Date of Patent: Oct. 2, 1984

[54] METHOD FOR FORMING COMPACTED BODIES OF GLASSMAKING RAW MATERIALS

[75] Inventor: Frank J. Lazet, Media, Pa.

[73] Assignee: PQ Corporation, Valley Forge, Pa.

[21] Appl. No.: 465,934

[22] Filed: Feb. 14, 1983

[51] Int. Cl.$^3$ ............................................... C03C 3/04
[52] U.S. Cl. ........................................... 65/27; 65/134; 106/DIG. 8; 106/74; 501/123
[58] Field of Search ............ 65/27, 134; 106/DIG. 8, 106/74; 501/123

[56] References Cited

U.S. PATENT DOCUMENTS 3,967,943  7/1976  Seeley ........................ 65/27

FOREIGN PATENT DOCUMENTS 2015012  10/1971  Fed. Rep. of Germany ......... 65/27

Primary Examiner—Robert Lindsay
Attorney, Agent, or Firm—Ernest G. Posner; Fred C. Philpitt; J. S. Steven Bobb

[57] ABSTRACT

Forming discrete bodies such as briquettes of glass forming raw materials is often advantageous in melting such materials to form said glasses. Such discrete bodies are formed by combining the particulate raw materials with a liquid binder and compressing the combination. This process is improved by using a dilute silicate solution as the liquid binder and by adding the maximum amount of the silicate solution to the raw materials that still provides a free-flowing dry appearing material. This amount of silicate solution results in a maximum crush strength when the discrete bodies are prepared.

7 Claims, No Drawings

METHOD FOR FORMING COMPACTED BODIES OF GLASSMAKING RAW MATERIALS

BACKGROUND OF THE INVENTION

This invention generally relates to the treatment of the raw materials used in glass making. In particular, the invention is directed to an improved method of preparing discrete bodies of raw materials to be fed to glassmaking furnaces.

In this application the terms "glass" or "insoluble glass" will be applied to the familiar insoluble materials, while the term "soluble glass" or "soluble silicate glass" will be applied to those materials that consist of alkali metal and silica and are dissolved to form the commercial class of materials known as silicates.

Soluble and insoluble silicate glasses are formed by the fusion of glass-forming materials in a furnace or hearth which is commonly called a glass tank. The raw materials are charged to the furnace heated to a temperature above the initial fusion point of the glass batch raw materials to form a molten bath. Such raw materials are generally referred to as "batch" and the "batch" ingredients common to most glasses are sodium carbonate (soda ash) and a source of silica such as sand. Other widely used ingredients primarily used in the production of insoluble glasses include: lime, limestone, borax, potash, alumina and salt cake. The "batch" is charged to the furnace and floats on the molten glass bath until it melts and reacts to become part of the bath which is eventually drawn from the furnace as the product.

The usual glassmaking practices are energy-intensive and, indeed, inefficient. The "batch" floating on the molten glass is almost a perfect insulator, which prevents rapid heat transfer to the molten glass. The glass must have a considerable residence time in the furnace to achieve homogeneity. This increased holding time also requires more energy. In addition, loose "batch" cannot be preheated efficiently.

In recent years, some attempts have been made to improve this process and the manner in which heat is utilized. In general these attempts involve agglomerating the "batch" in some manner and then pre-heating these materials before charging them to the furnace. U.S. Pat. Nos. 3,542,534; 3,607,190; 3,726,697; 3,788,832; 3,800,639; 3,953,190; 4,023,976; 4,045,197 and 4,135,904 among others disclose various means for attempting to increase the efficiency of the glassmaking process. These techniques can achieve some increased heat utilization since furnace combustion gases are used as a source of heat. U.S. Pat. No. 4,023,976 cited hereinbefore is believed to be representative of the art that is most relevant to my improved process.

The prior art methods of preparing discrete bodies, usually briquettes, involve mixing a liquid binder, (water, caustic, silicate solutions, etc.) with the batch materials to form a moist, clinging mass of particles which is then compressed in some sort of die, roller or extruder to form the desired discrete bodies. There are several problems associated with such prior art methods. The addition of a substantial amount of moisture to the materials that constitute glassmaking batches can cause a significant portion of said batch to stick to batch handling equipment such as mixers and conveying equipment. Complete consolidation of the batch is also possible when using such methods. In addition, moisture added as part of, or as the total, binder must be removed prior to glass formation, at an undesirable expenditure of energy. It is apparent that there can be some significant improvements in the preparation of discrete, compacted bodies to be charged to glassmaking furnaces. It is an object of this invention to minimize the problems encountered in forming the desired discrete bodies such as briquettes.

SUMMARY OF THE INVENTION

I have discovered a surprising improvement in the production of compacted discrete bodies, usually briquettes, of the raw materials for glassmaking. This improvement prevents caking, consolidation and sticking of the raw materials while minimizing the amount of moisture that must be removed prior to glass formation. My improvement comprises mixing the raw material batch with about the maximum amount of a dilute alkali metal silicate solution (about 10 to 30% of silicate solids) that can be added to said batch while maintaing a free-flowing material that appears to be dry. This free-flowing mixture is then compressed to form the desired body. Surprisingly, the discrete bodies made from this free-flowing material have higher green strengths than bodies made with either more or less of said silicate solutions. It is especially desirable that such a maximum green strength as a function of composition be discovered since bodies of high green strengths can be formed with a minimum forming pressure; higher pressures lead to stronger bodies but accelerate die wear to an unacceptable level.

THE INVENTION

The process of my invention can be used in making either soluble alkali metal silicates or insoluble glasses, and is carried out on the raw material "batch." Said "batch" may contain numerous components of fine particle size if an insoluble glass is the product, or may be a simple two-component system if a soluble silicate is the product. The insoluble glasses may be, for example, soda lime, borosilicate, alumino-silicate or lead glasses. Raw materials commonly used in glassmaking include lime, soda ash, sand, silica flour, borax, feldspar, nepheline syenite, magnesium carbonate, potassium carbonate, iron oxide, dolomite, sodium hydroxide, potassium hydroxide, potash, fluorspar, barium carbonate, limestone, alumina, salt cake (sodium sulfate), gypsum and other equivalent materials.

Essentially any material that is needed in making glasses including glass network formers, modifiers and intermediate glass formers can be advantageously processed by the method of my invention. Glass network formers are those materials that form the backbone structure of the glass and exhibit cation-to-oxygen bond strengths greater than 80 kcal/mol. Examples of these materials include, among others:

| | |
|---|---|
| $SiO_2$ | $Sb_2O_3$ |
| $B_2O_3$ | $Sb_2O_5$ |
| $P_2O_5$ | $Al_2^{(IV)}O_3$ (coordination |
| $P_2O_3$ | number of Al is 4) |

Modifiers are those glassmaking ingredients which do not form networks, but interrupt the structure and change the properties of the product. Examples of these materials include, among others, $Na_2O$, $K_2O$, $Li_2O$, $Rb_2O$, $SnO_2$, $PbO_2$, $MgO$, $PbO$, $BaO$ and $CaO$. Intermediate materials are those materials that have some network forming capacity or may act as modifiers depending on conditions including the other ingredients, coordination number and the like. Examples include, among others, $TiO_2$, $ZnO$, $PbO$, $Al^{(VI)}_2O_3$ (coordination number of 6) and $ZrO_2$. Our raw materials then must contain at least one ingredient that has a cation-to-oxygen bond strength of 80 kcal/mol and whatever modifiers and/or intermediate compounds are required to produce the desired product glass. Glasses and their preparation are discussed in various publications including: Boyd and Thompson, "Glass," *Encyclopedia of Chemical Technology*, 3rd Edition, (Wileyl-Interscience; New York: 1980; Volume 11, pp. 807–855); Pye, Stevens and LaCourse, Eds., *Introduction to Glass Science*, (Plenum Press; New York: 1972); and Tooley, Ed., *The Handbook of Glass Manufacture*, (Books for Industry Inc.,; New York: 1974). These publications are incorporated herein by reference as disclosing glasses that can be prepared according to the teachings of my invention, their raw materials and compositions.

Another raw material that can be used in the process of my invention is cullet. Many glasses require the inclusion of cullet, or previously fused glass, to provide processing advantages.

Soluble alkali metal silicate glasses are formed by the fusion of a source of alkali metal and silica, usually an alkali metal carbonate and sand. For example, sodium silicate is usually formed by fusing sand and soda ash. The composition of such glasses is given by the mole ratio of $SiO_2/M_2O$ wherein M represents an alkali metal, usually sodium and/or potassium. Such glasses that contain 0.9 to 5.0 moles of $SiO_2$ per mole of $M_2O$ are prepared by the process of our invention. We prefer to prepare glasses that contain 1.5 to 4.5 moles of $SiO_2$ per mole of $M_2O$.

Even the simplest of these raw material "batches" consists of materials of different particle size and density. A number of processing problems have been associated with these physical characteristics in the past. Some of the ingredients can be entrained in the combustion gases resulting in plugging and/or eroding various furnace structures. These entrained materials must be trapped in the stack or they will be discharged to the environment if the process of my invention is not employed.

To implement the improvement of my process the particulate raw materials are blended and then mixed with diluted silicate solution to form a free-flowing, dry appearing mixture. This material is compressed to form the desired discrete body, said compression being carried out as soon as possible after the silicate solution contacts the other raw materials. The compressed discrete body has sufficient green strength to be handled and develops more strength as it ages.

The amount of diluted silicate solution required to provide the improvement of my invention varies with the composition of the raw material batch to be treated but it will always be the maximum amount of the silicate solution that can be added to the batch without forming a damp, clinging mixture. In general, the addition of 2.2 to 3.9% by weight of the silicate solution based on the weight of the batch is required. If a glass that contains about 1.4 to 1.8 moles of $SiO_2$ per mole of $Na_2O$ is to be prepared, the amount of dilute silicate solution required is about 2.3 to 2.7% by weight. If the glass is 2.2 to 2.6 moles of $SiO_2$ per mole of $Na_2O$, 3.3 to 3.7% of the silicate solution is to be used.

The composition and concentration of the dilute silicate solution is important to the improvement of my invention. The solution should contain 1.8 to 2.8 moles of $SiO_2$ per mole of $M_2O$, wherein M is sodium or potassium. I prefer to use a solution that contains 2.2 to 2.6 moles of $SiO_2$ per mole of $M_2O$. The concentration of the silicate solution should be 12 to 30% by weight of silicate solids. I prefer 14 to 22% silicate solids. While free-flowing, dry appearing mixtures can be formed with silicate solutions that do not have the recited compositions and concentrations, these mixtures cannot be compressed at a moderate pressure to provide maximum green strength.

Any method that subjects the free-flowing, dry appearing mixtures to pressure that results in forming discrete bodies of sufficient strength can be the appropriate forming step in my improved method. Extruding, tabletting, briquetting, forming sheets or ribbons to be cut or broken and similar processes are suitable. Briquetting wherein the free-flowing, dry appearing mixture is compressed in dies between two rollers appears to be very useful. The pressure used to produce the discrete bodies required by the process of our invention depends upon the type of agglomerating process and compositional variables. The minimum pressure required is that which forms discrete bodies with sufficient strength to be handled. This pressure should not be so intense that the discrete bodies exhibit "rebound"—splitting from being compressed too strongly. This mixture can be compressed or compacted at 500 to 30,000 psi to form the discrete bodies required by our process. In any case, the bodies must have sufficient strength to be handled, or a compressive strength above about 20 psi for small bodies of about 25 g. Larger bodies of 85 to 90 g should have compressive strengths above about 90 psi. The discrete bodies should be free-flowing and stable; they can be used at once or stored and used at some later time. We prefer to use briquettes made in a roll briquetter, the roll separating pressure being about 500 to 3000 psi and the actual forming pressure being 1000 to 10,000 psi.

The discrete bodies, usually briquettes, formed by the improved process of my invention have compressive strengths of about 40 to 100 psi, are readily handled and can be stored conveniently. These discrete bodies can be used for any purpose usually ascribed to such materials.

EXAMPLES

The following examples illustrate certain embodiments of the improvement of my invention. These examples are not presented with the intention of establishing the scope of my invention, said scope being established in the disclosure and recited in the claims.

EXAMPLE 1

This example illustrates my improved process in forming 25 g pellets of the raw materials required to form a sodium silicate glass. For each test sufficient sand and soda ash were combined to form 25 g of a raw material batch that would form a glass containing 2.4 moles of $SiO_2$ per mole of $Na_2O$. After these materials were blended to a uniform mixture various amounts of a sodium silicate solution were added and blended. The sodium silicate solution contained 2.4 moles of $SiO_2$ per mole of $Na_2O$ and 16% by weight of silicate solids. The uniform blend was immediately compacted at 5000 psi using a carver press. After de-molding the pellet was crushed in a carver press and the crush strength noted. Table 1 summarizes the data obtained.

TABLE 1

| Amount of Binder (%) | Crush Strength (psi) | Description of Mixture Compressed |
| --- | --- | --- |
| 1.0 | 15 | Free-flowing |
| 1.5 | 28 | Free-flowing |
| 2.0 | 35 | Free-flowing |
| 2.5 | 40 | Free-flowing |
| 3.5 | 58 | Free-flowing |
| 4.5 | 50 | Damp |
| 5.5 | 40 | Damp, clinging |
| 6.5 | 18 | Damp, clinging |

These results indicate that a maximum strength is developed when about the maximum amount of the silicate solution is added that still forms a free-flowing mixture.

EXAMPLE 2

In another series of runs pellets of 25 g of the sand and soda ash required to make sodium silicate glasses with 1.6, 2.4 and 3.2 moles of $SiO_2$ per mole of $Na_2O$ were prepared and tested in the manner described in Example 1 with the same silicate solution. The results are summarized in Table 2.

TABLE 2

| Batch | Amount of Binder (%) | Crush Strength (psi) | Description of Mixture Compressed |
| --- | --- | --- | --- |
| 1.6 $SiO_2/NaO_2$ | 1.5 | 35 | Free-flowing |
| | 2.0 | — | — |
| | 2.5 | 46 | Free-flowing |
| | 3.5 | 23 | Damp |
| | 4.5 | 10 | Damp, clinging |
| | 5.5 | — | — |
| 2.4 $SiO_2/NaO_2$ | 1.5 | 18 | Free-flowing |
| | 2.0 | — | — |
| | 2.5 | 35 | Free-flowing |
| | 3.5 | 50 | Free-flowing |
| | 4.5 | 35 | Damp |
| | 5.5 | 21 | Damp, clinging |
| 3.2 $SiO_2/Na_2O$ | 1.5 | 13 | Free-flowing |
| | 2.0 | 14 | Free-flowing |
| | 2.5 | 23 | Free-flowing |
| | 3.5 | 11 | Damp |
| | 4.5 | 8 | Damp, clinging |
| | 5.5 | 7 | Damp, clinging |

These results also indicate that maximum green strength is developed when the discrete bodies are formed using the maximum amount of silicate solution that can be blended with the raw materials while maintaining the mixture dry in appearance and free-flowing. The results also show that it appears that the level of silicate solution that constitutes this maximum is dependent upon the composition of the glass.

I claim:

1. In the process of preparing compacted discrete bodies of glass-forming raw materials by combining said raw materials with a liquid binder and subjecting the resulting batch-binder combination to pressure, the improvement comprising: the liquid binder being alkali metal silicate solution containing 10 to 30% by weight of silicate solids and that the amount of said silicate solution combined with the raw materials be the maximum that can be added while maintaining a free-flowing, dry appearing mixture.

2. The process of claim 1 wherein the silicate solution contains 1.8 to 2.8 moles of $SiO_2$ per mole of $M_2O$, wherein M is sodium or potassium and sufficient of said silicate solution is added to provide 2.2 to 3.9% by weight of the batch-binder combination.

3. In the process of forming discrete bodies of sand and an alkali metal carbonate by combining said materials with a liquid binder and subjecting the resulting batch-binder combination to pressure, the improvement comprising: the liquid binder being an alkali metal silicate solution containing 14 to 22% silicate solids and 2.2 to 2.6 moles of $SiO_2$ per mole of $M_2O$, wherein M is sodium or potassium and that said batch-binder combination contains sufficient of said silicate solution to provide a discrete body of maximum crush strength while the batch-binder composition remains free-flowing.

4. The process of claim 3 wherein the batch-binder composition contains 2.2 to 3.9% of the silicate solution by weight.

5. In the process of forming discrete bodies of sand and soda ash by combining said materials with a liquid binder and subjecting the resulting batch-binder combination to pressure, the improvement comprising: the binder being a sodium silicate solution containing 14 to 22% by weight of silicate solids and 2.2 to 2.6 moles of $SiO_2$ per mole of $Na_2O$ and the batch-binder composition contains 2.2 to 3.9% by weight of said silicate solution.

6. The process of claim 5 wherein the sand and soda ash contain 1.4 to 1.8 moles of $SiO_2$ per mole of $Na_2O$ and the batch-binder composition contains 2.3 to 2.7% by weight of said silicate solution.

7. The process of claim 5 wherein the sand and soda ash contain 2.2 to 2.6 moles of $SiO_2$ per mole of $Na_2O$ and the batch-binder composition contains 3.3 to 3.7% by weight of said silicate solution.

* * * * *